Patented Apr. 18, 1939

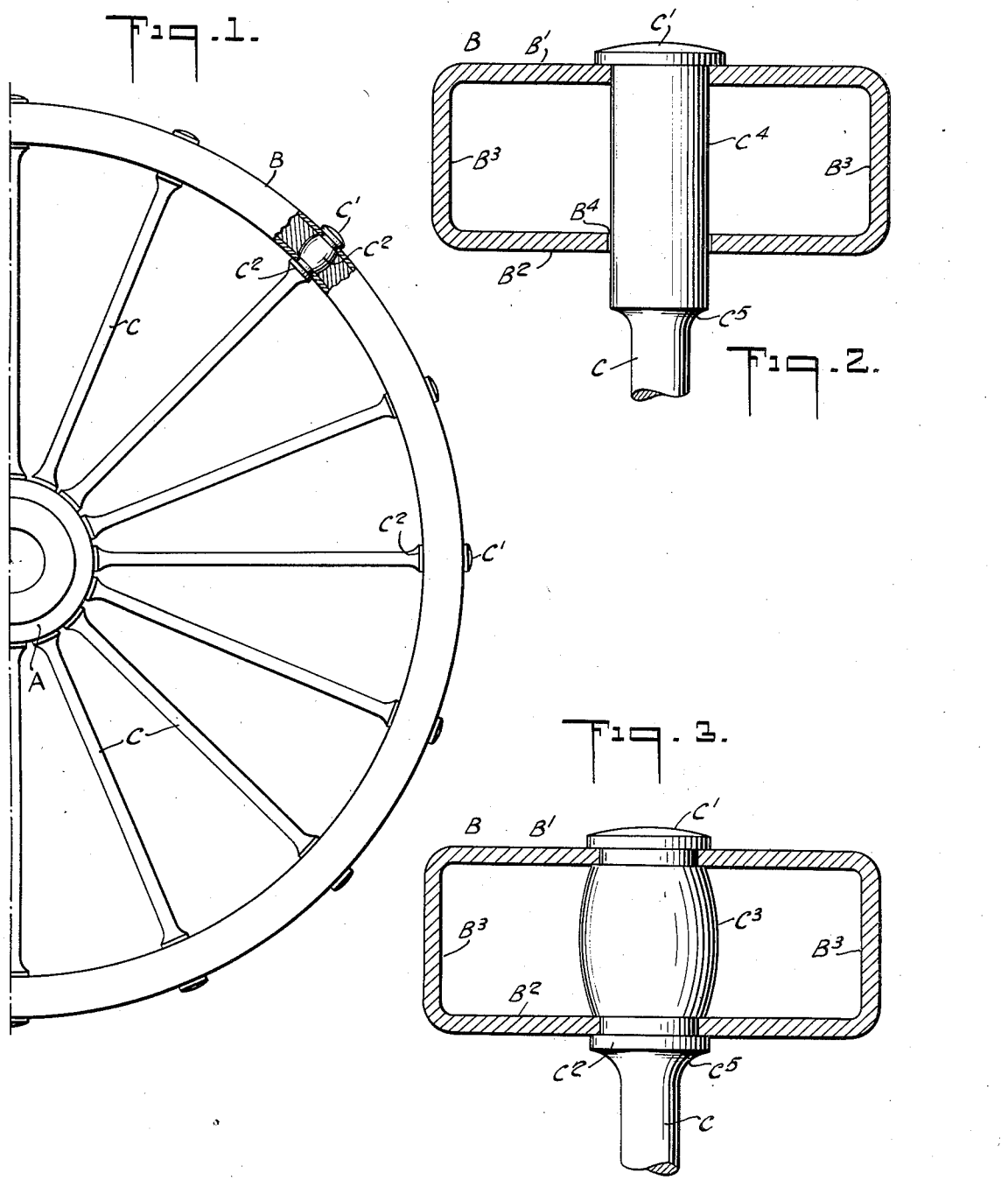

2,154,617

UNITED STATES PATENT OFFICE 2,154,617

METHOD OF MANUFACTURING WHEELS

Joseph L. Hecht, Davenport, Iowa, assignor to French & Hecht, Incorporated, a corporation of Iowa Application January 21, 1937, Serial No. 121,388

3 Claims. (Cl. 29—159.02)

This invention relates to wheel structures, and more particularly to the method of manufacturing metal wheels presenting hub and rim members, either or both of which are formed of tubular material and wherein spokes or other intermediate connecting means are anchored in the hub and rim to secure the parts together, as shown in my copending application Ser. No. 746,041, since matured into U. S. Letters Patent No. 2,088,956, dated August 3, 1937.

A wheel of this character presents many advantages and desirable features over a wheel constructed of solid metal parts, particularly in that it offers great strength in a light weight wheel and possesses greater resiliency and shock absorbing qualities. These features combine to form a wheel of superior quality and one which is highly desirable for the reason that it increases the life of the vehicle of which it is a part. Other structural features, and features of adaptation will be apparent to those familiar with the art and the conditions of use which must be borne in mind in designing a wheel structure.

In the manufacture of such a wheel, however, difficulty is encountered in rigidly connecting the different parts thereof and in supporting the walls of the tubular members against distortion and collapse from usage.

It is the object of the present invention to overcome the foregoing difficulty and, to this end, the invention, in its broader aspects, contemplates the method of manufacturing a wheel structure presenting a tubular hub or rim member, or both, and intermediate connecting means anchored therein and formed within the tubular member to support opposite portions of the wall thereof so as to maintain their spaced relation. More specifically, the invention provides a method of forming a spoke anchorage in a tubular hub or rim member such that a collar is provided on the portion of the spoke within the tubular member, the ends of the collar engaging the inner surfaces of opposite portions of the wall of said member and thereby acting as a spacer and support for the wall portions as well as means for anchoring the spoke therein.

In the accompanying drawing, the invention has been shown merely by way of example and in preferred form, but obviously many modifications and variations of the invention may suggest themselves to those skilled in the art which will still be comprised within its spirit. It is to be understood, therefore, that the invention is not limited to any specific form or embodiment, except insofar as such limitations are specified in the appended claims.

Referring to the drawing:

Fig. 1 is a fragmentary view of the improved wheel partly broken away to show its construction;

Fig. 2 is a transverse section through the rim of the wheel, showing the arrangement of the parts in an initial stage of manufacture; and Fig. 3 is a view similar to Fig. 2, showing the parts in completed form.

As already stated, the invention is directed to a wheel structure presenting a hub or rim, or both, formed of tubular material and having intermediate connecting means (whether spokes or disc, etc.) anchored therein and formed to support the wall of the tubular member against collapse and distortion. However, a complete understanding of the invention may be had from the description to follow and the accompanying drawing illustrating it as applied to a spoked wheel presenting the rim only of tubular construction.

Referring particularly to Fig. 1, there is illustrated a portion of a wheel comprising a hub A and a rim B connected by spokes C. The rim, as more clearly illustrated in Figs. 2 and 3, is formed of tubular material rectangular in cross-section and presenting concentric outer and inner walls or wall portions $B^1$ and $B^2$, respectively, and side walls $B^3$. The shape of the rim, however, is purely a matter of design and may differ in wheels intended for use under different conditions.

The ends of the spokes C pass entirely through the rim, that is, through both walls $B^1$, $B^2$ and are anchored therein by being headed over as at $C^1$ and shouldered as at $C^2$ and formed within the tubular rim of increased diameter or with a collar $C^3$. Thus the spoke C is rigidly anchored in the rim B with the wall $B^1$ clamped between the headed end $C^1$ of the spoke and the collar $C^3$ while the wall $B^2$ is clamped between the collar $C^3$ and the shoulder $C^2$, the collar $C^3$, with its ends engaging the inner surfaces of the walls $B^1$ and $B^2$, acting as a support to maintain the spaced relation of said walls.

In the manufacture of the wheel, the tubular rim B is perforated at intervals throughout its circumference so as to form alined apertures $B^4$ in the concentric walls $B^1$ and $B^2$, each pair of apertures being adapted to receive the end of a spoke C. Preferably, and as shown in Fig. 2, each spoke C is formed with an enlarged end portion $C^4$ and with the headed end $C^1$ prior to its insertion in the rim. After it has been arranged in the rim, as shown in Fig. 2, the spoke is subjected to an upsetting action (preferably while heated) by suitable upsetting means bearing against the headed end $C^1$ and the end $C^5$ of the enlarged portion $C^4$, which, as will be noted extends radially inward from the wall $B^2$ a predetermined distance so as to present sufficient metal for displacement to form the collar $C^3$ and shoulder $C^2$ of the desired size. Force applied at the point $C^5$ in a direction toward the headed end $C^1$ of the spoke C causes the enlarged portion $C^4$ to expand within the tubular rim B to form the collar $C^3$ and exteriorly of the wall $B^2$ to form the shoulder $C^2$, means being provided to prevent lateral displacement of the metal exteriorly of the rim except for the formation of said shoulder.

Although the invention has been shown and described in its preferred form, it is to be understood that the same result may be accomplished otherwise. For example, it is possible to perforate the wall $B^2$ only and insert the end of a headless spoke to such extent that its end engages the inner surface of the wall $B^1$. In this instance, the formation of the collar $C^3$ alone will serve not only to support the walls $B^1$ and $B^2$ in their spaced relation but also to anchor the spoke in the rim. Formation of the shoulder $C^2$ in addition to the collar will, of course, provide a more rigid and secure anchorage. The invention applies equally well in the case of a disc wheel in which instance the peripheral edge of the disc may be inserted through a continuous circumferential incision in the wall $B^2$ until said edge engages the inner surface of the wall B and the disc then upset to form within the tubular rim B lateral circumferential beads on opposite sides thereof to function just as the collars $C^3$ on the spokes. The disc may also be formed, either before insertion into the rim or by the upsetting action, with circumferential beads exteriorly of the wall $B^2$ to serve the same purpose as the shoulders $C^2$ on the spokes C.

The method of manufacture is the same for anchoring spokes or a disc or other means in a hub constructed of tubular material and, although described by way of example as carried out in a particular manner, it is to be understood that the method is not limited to any specific steps or sequence of steps except insofar as such limitations are specified in the appended claims.

Having thus described my invention what I claim is:

1. Steps in the method of manufacturing a wheel having hub and rim members at least one of which is formed of material tubular in cross-section, which consist in inserting means for connecting said members together through an aperture in the wall of said tubular member and into engagement with the inner surface of the opposite portion of the wall and in one operation upsetting said means to expand it in the region of the tubular member exteriorly and interiorly thereof in engagement with the apertured portion of the wall and to form supporting means interiorly of the member for maintaining the spaced relation of said opposite wall portions.

2. The method of anchoring a spoke in a tubular member of a wheel, which consists in inserting the spoke through an aperture in the wall of the member to such extent at least that the end of the spoke engages the opposite portion of the wall of the member, and in one operation upsetting the spoke to expand it adjacent the inner and outer surfaces of the apertured portion of the wall.

3. The method of anchoring a spoke in a tubular member of a wheel, which consists in inserting an enlarged end portion of the spoke through alined apertures in concentric wall portions of the member, and subjecting the enlarged portion of the spoke to an upsetting action simultaneously to increase its diameter throughout the radial extent between the inner surfaces of the apertured wall portions, thereby forming a support to maintain said wall portions in their spaced relation, and to head over the end of the spoke exteriorly of one wall portion and to form a shoulder exteriorly of the opposite wall portion, so as to clamp said wall portions rigidly between the interior upset portion of increased diameter and said head and shoulder.

JOSEPH L. HECHT.